(12) United States Patent
Itoh

(10) Patent No.: US 6,491,411 B2
(45) Date of Patent: Dec. 10, 2002

(54) SHEET-LIKE LIGHT SOURCE DEVICE

(75) Inventor: Atsushi Itoh, Kumamoto (JP)

(73) Assignee: Advanced Display Inc., Kikuchi-gun (JP)

( * ) Notice: Subject to any disclaimer, the term of this patent is extended or adjusted under 35 U.S.C. 154(b) by 0 days.

(21) Appl. No.: 09/886,252

(22) Filed: Jun. 22, 2001

(65) Prior Publication Data

US 2002/0030993 A1 Mar. 14, 2002

(30) Foreign Application Priority Data

Sep. 8, 2000 (JP) ........................................ 2000-273785

(51) Int. Cl.[7] ............................................... F21V 13/04
(52) U.S. Cl. ........................ 362/246; 362/245; 362/241; 362/225; 362/330; 362/558; 362/31; 349/62
(58) Field of Search ................................. 362/246, 241, 362/242, 243, 244, 245, 247, 561, 224, 225, 330, 223, 558, 31; 349/64, 65, 62; 385/901

(56) References Cited

U.S. PATENT DOCUMENTS 4,864,475 A * 9/1989 Jung ........................... 362/231
5,676,444 A * 10/1997 Liao ............................ 362/31
6,419,369 B1 * 7/2002 Itoh ............................. 362/26

OTHER PUBLICATIONS

U.S. patent application Ser. No. 09/614,911, filed Jul. 12, 2000, pending.
U.S. patent application Ser. No. 09/656,272, filed Sep. 6, 2000, pending.
U.S. patent application Ser. No. 09/685,039, filed Oct. 10, 2000, pending.

* cited by examiner

*Primary Examiner*—Sandra O'Shea
*Assistant Examiner*—Ronald E. DelGizzi
(74) *Attorney, Agent, or Firm*—Oblon, Spivak, McClelland, Maier & Neustadt, P.C.

(57) ABSTRACT

A sheet-like light source device comprising a plurality of bar-shaped light sources, a diffusing plate for diffusing light emitted from the light sources, and a reflecting plate capable of mirror reflecting the light emitted from the light sources to the diffusing plate side. The reflecting plate is provided in a position opposite to the diffusing plate with respect to the light sources. The reflecting plate has at least one convex portion formed in parallel with the light sources in a space between the two adjacent light sources. It is possible to decrease or remove shield printing which has conventionally carried out over the diffusing plate, thereby enabling manufacture of a back light having a high efficiency.

14 Claims, 9 Drawing Sheets

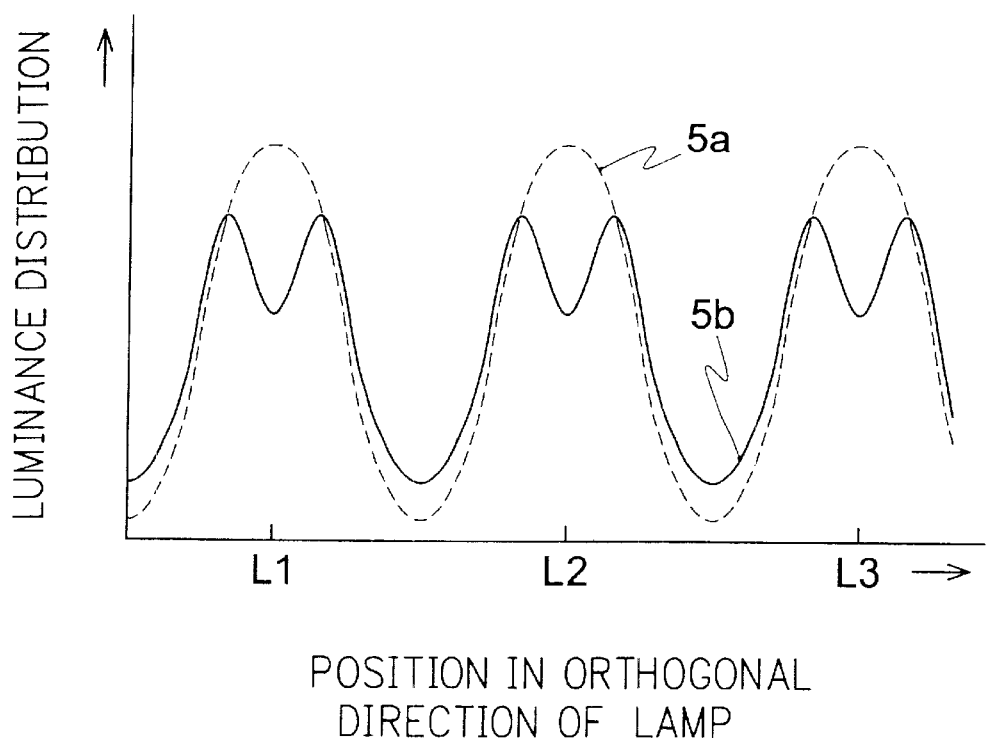

AXIAL DIRECTION OF LAMP

SHEET-LIKE LIGHT SOURCE DEVICE

BACKGROUND OF THE INVENTION

The present invention relates to a sheet-like light source device. More particularly, the present invention relates to a back light device of a perpendicular type to be used as a back light of a liquid crystal display.

A non-light emission display device such as a liquid crystal display is provided with a sheet-like light source device referred to as a back light to irradiate uniform light on an image display element from the back. For the back light, a back light of a side-light type has been often used with a reduction in the thickness of the liquid crystal display.

In the side-light type, however, an increase in the size of the screen and the precision of a recent liquid crystal display is limited. For this reason, a back light having a higher luminance has been required than that of the back light of the side-light type which is a current mainstream. For the request, recently, a back light of a perpendicular type shown in FIGS. 9 and 10 has often been manufactured. FIG. 9 is an exploded perspective view and FIG. 10 is a sectional view.

More specifically, the back light of the perpendicular type has a plurality of light sources 21 (for which a fluorescent lamp is mainly used) provided in a space under a display device 25 and serves to guide light of the light source 21 to the display device 25. In that case, a reflecting plate 22 is provided on the opposite side of the display device 25 with respect to the light source 21 in order to efficiently guide light of the light source 21 to the display device 25 side. In many cases, it is hard to control the direction of light emitted from a lamp. Therefore, a white reflecting plate 22 for diffusing and reflecting light is selected. Moreover, a diffusing plate 23 is provided between the light source 21 and the display device 25 in order to make the light emitted from the light source 21 uniform. In some cases, furthermore, optical sheets (not shown) such as a prism sheet for collecting light in a desirable direction is provided between the diffusing plate 23 and the display device 25.

In a conventional back light device, the light (direct light) directly emitted from the light source 21 to the light emitting face side is directly incident on the diffusing plate 23, and light emitted to the anti-light emitting face side is reflected by the reflecting plate 22 and is then incident on the diffusing plate 23 (reflected light). As a result, a luminance is high on a display surface just above the light source 21 and a display unevenness is recognized. For this reason, a light uniform processing is carried out, that is, the diffusing plate 23 is subjected to printing for shielding light. Thus, uniform light emission can be obtained.

In the conventional back light device of the perpendicular type, a dimension in a vertical direction is less restricted than that of the back light device of the side-light type and the degree of a display unevenness is also lessened. The above technique can be employed because uniform light emission can be obtained by only the printing on the diffusing plate 23. In the near future, however, it is apparent that a back light device having a small thickness, a narrow frame and a high efficiency is required for the back light device of the perpendicular type in the same manner as the back light device of the side-light type. In the thin back light of the perpendicular type, a ratio of direct light to reflected light is different from that of the conventional back light and the direct light is more increased than the reflected light. For this reason, the light shield printing on the diffusing plate 23 cannot fully make the light uniform. Thus, there has been a problem that the display unevenness is more remarkable. Moreover, when the intense direct light is shielded through the light shield printing subjected to the diffusing plate 23 in the same manner as that in the conventional art, the utilization efficiency of the light of the back light is reduced so that the efficiency of the back light is deteriorated.

Japanese Unexamined Patent Publication No. 275525/1992 or the like has disclosed a technique for making light uniform without using the light shielding means. In a liquid crystal display having a back light described in the publication, a reflecting plate is protruded upward like a mountain in the middle position of two adjacent light sources, and a convex portion of the reflecting plate serves as a mirror surface and a concave portion thereof serves as a scattering surface. Accordingly, it is necessary to carry out a working and an assembly with high precision in order to actually apply these techniques or a plurality of expensive members should be additionally used, which is contrary to the fabrication of a back light at a low cost. Therefore, it is hard to fabricate an inexpensive plane light source through these techniques.

The present invention has been made to eliminate the above-mentioned drawbacks, it is an object thereof to provide a sheet-like light source device which is inexpensive and thin and has a uniform luminance distribution while minimizing a reduction in the utilization efficiency of light.

SUMMARY OF THE INVENTION

In accordance with the present invention, there is provided a sheet-like light source device comprising a plurality of bar-shaped light sources, a diffusing plate for diffusing light emitted from the light sources, and a reflecting plate capable of mirror reflecting the light emitted from the light sources to the diffusing plate side, the reflecting plate being provided in a position opposite to the diffusing plate with respect to the light sources, wherein the reflecting plate has at least one convex portion formed in parallel with the light sources in a space between the two adjacent light sources.

It is preferable that the convex portion takes a sectional shape having three or more straight portions.

It is preferable that a straight portion forming at least a base bottom part of the convex portion is set to have such an angle as to reflect the light emitted from the light source onto a part almost just above the light source, and a straight portion provided on the base bottom part of the convex portion is set to have such an angle as to reflect the light emitted from the light source onto a portion between the two adjacent light sources.

It is preferable that an inclination of each straight portion constituting the sectional shape of the convex portion has a relationship of:

$$\theta_1 < \theta_2 < \ldots < \theta_n \tag{1}$$

(wherein $\theta_n$ represents an angle formed by the straight portion and a normal of the diffusing plate and n=1 represents a straight portion forming the base bottom part of the convex portion of the reflecting plate).

It is preferable that the sectional shape of the convex portion is symmetrical with respect to a center line of the two adjacent light sources arranged in parallel.

It is preferable that a straight portion constituting the section of the convex portion which is the closest to the diffusing plate is parallel with the diffusing plate.

It is preferable that both ends of the reflecting plate in a direction of the arrangement of the light sources is constituted by a portion perpendicular to the diffusing plate and a half on one of sides of the convex portion.

It is preferable that the convex portion has a plurality of sectional shapes in an axial direction of the light source.

It is preferable that the sectional shapes of the convex portion is continuously changed in the axial direction of the light source.

It is preferable that a plurality of convex portions are provided and two adjacent convex portions have different sectional shapes.

It is preferable that a wiring of the light source is accommodated on an internal face side of the convex portion.

In accordance with present invention, there is also provided a sheet-like display device comprising a sheet-like light source device and at least a plane type display part, wherein the sheet-like source device comprises a plurality of bar-shaped light sources, a diffusing plate for diffusing light emitted from the light sources, and a reflecting plate capable of mirror reflecting the light emitted from the light sources to the diffusing plate side, the reflecting plate being provided in a position opposite to the diffusing plate with respect to the light sources, and wherein the reflecting plate has at least one convex portion formed in parallel with the light sources in a space between the two adjacent light sources.

It is preferable that the plane type display part displays an image by utilizing a birefringence of a liquid crystal.

It is preferable that a member for an electric circuit is accommodated on an internal face side of the convex portion.

More specifically, the technical means of the present invention pays attention to the fact that the light emitted from the light source toward the reflecting plate has conventionally been reflected by diffusion reflection and has not been controlled. Thus, the present invention has an object to provide a back light which is thin and inexpensive and has a high efficiency by using a reflecting surface of the reflecting plate to carry out mirror reflection, thereby controlling the light and minimizing or deleting printing to be performed over the diffusing plate. Moreover, other members for making the light uniform are not required. Therefore, it is possible to fabricate an inexpensive sheet-like light source during mass production.

BRIEF DESCRIPTION OF THE DRAWINGS

FIG. 6 is a graph showing a luminance distribution obtained when a reflecting plate having no convex portion is used according to a comparative example of the present invention;

DETAILED DESCRIPTION

Preferred embodiments of the present invention will be described below in more detail with reference to the drawings.

Embodiment 1

Figure 1:
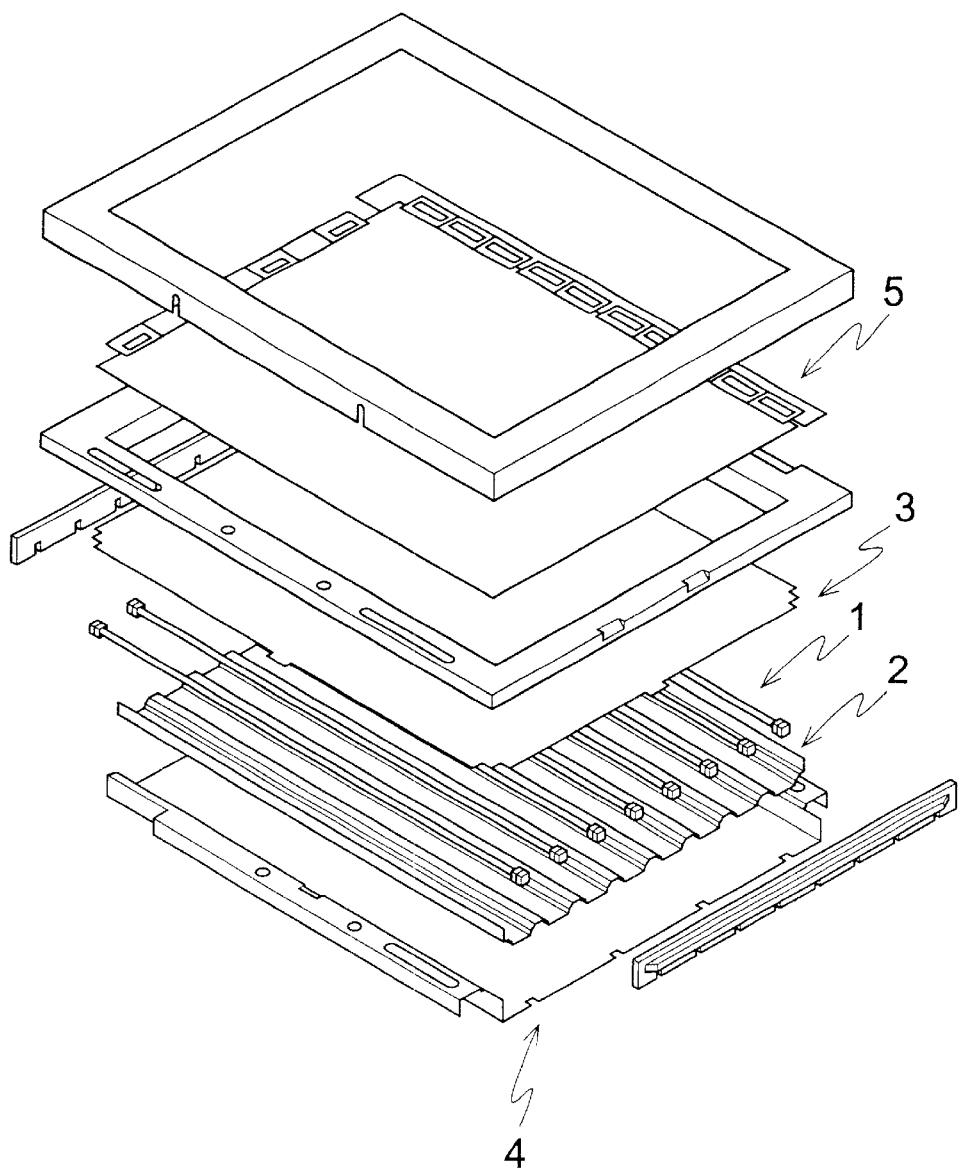
FIG. 1 is an exploded perspective view showing a sheet-like display device according to Embodiment 1 of a sheet-like light source device of the present invention.
Figure 2:
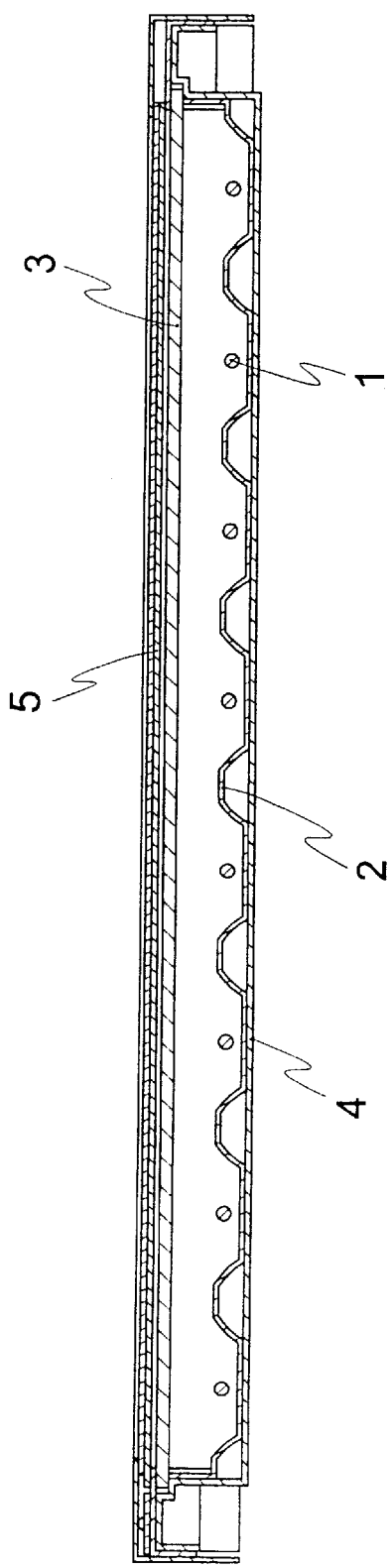
FIG. 2 is a sectional view illustrating the sheet-like light source device in FIG. 1.
Figure 3:
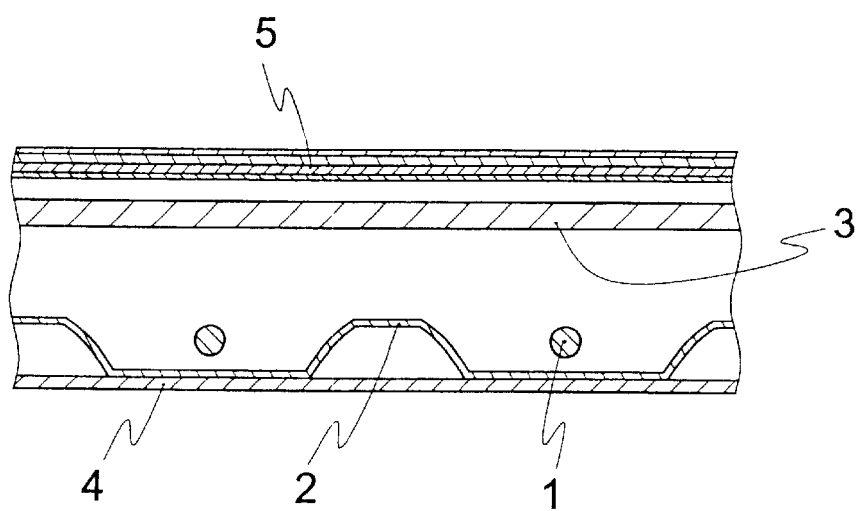
FIG. 3 is a partially enlarged sectional view of FIG. 2.

FIG. 1 is an exploded perspective view showing a sheet-like light source according to Embodiment 1 of the present invention, FIG. 2 is a sectional view and FIG. 3 is a partially enlarged sectional view of FIG. 2. Reference numeral 1 denotes a lamp to be a light source (for example, a cold cathode tube). A plurality of lamps are provided parallel to a display surface. Reference numeral 2 denotes a reflecting plate having such a shape as to reflect light emitted from the lamp 1 and to make light emission uniform on the display surface side. The reflecting plate 2 is fabricated by depositing aluminum, silver or the like on a material mainly carrying out mirror reflection to control the reflected light, for example, a metal and by causing the surface to be subjected to an electric insulation processing. Reference numeral 4 denotes a housing for accommodating the lamp 1, the reflecting plate 2 and a diffusing plate 3 and is used for fixing each internal member. In general, the housing 4 comprises a plurality of members and is also used for emitting the light transmitted from the lamp 1 from only a light emission surface. Reference numeral 3 denotes a diffusing plate formed of a resin (acryl, polycarbonate or the like) having a light scattering substance mixed therein and has a thickness of approximately several mm. The diffusing plate 3 is provided to uniformly expand the light directly emitted from the lamp 1 or the light reflected by the reflecting plate 2 in a display surface without an unevenness. Moreover, at least one optical sheet (not shown) such as a prism sheet for collecting the light emitted from the diffusing plate 3 in a desirable direction might be provided on the diffusing plate 3 according to specification. Reference numeral 5 denotes a non-light emission display device such as a liquid crystal display for displaying characters, graphics and the like by selectively transmitting the light from the sheet-like light source. For example, it is possible to employ a liquid crystal display panel for displaying an image by utilizing birefringence of a liquid crystal.

Figure 4:
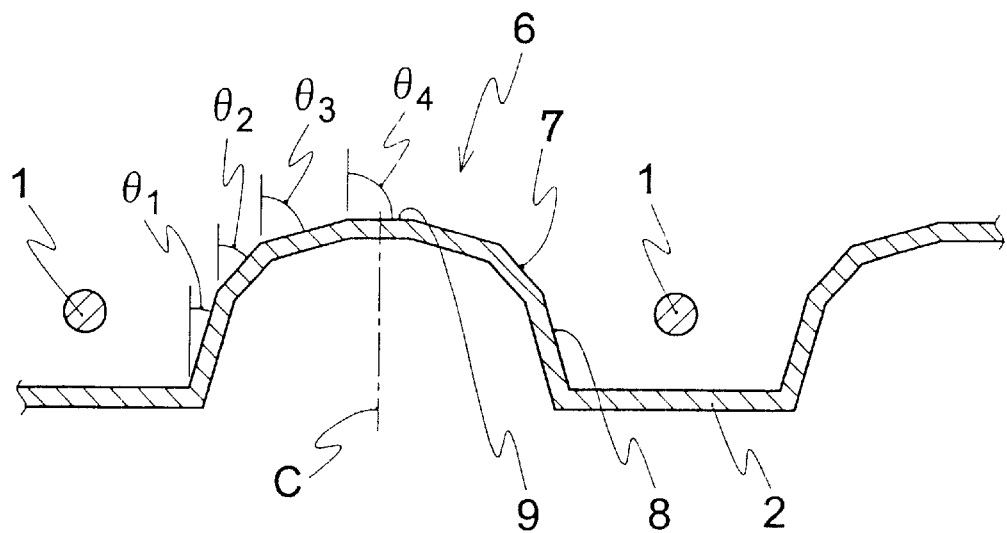
FIG. 4 is a sectional view showing the shape of a reflecting plate in FIG. 2.

Furthermore, the shape of the reflecting plate 2 will be described with reference to FIG. 4. FIG. 4 illustrates a convex portion 6 taking the sectional shape of a polyhedron in which a section has seven straight portions 7.

In the case of a flat reflecting plate for carrying out diffusion reflection which has conventionally been used frequently as a comparative example, a portion provided just above the lamp 1 is bright and a space between the two adjacent lamps 1 is dark as shown in a broken line 5a of FIG. 6 if light shield printing is not carried out over the diffusing plate 3. Moreover, if a flat mirror reflecting member is used, a luminance is more increased if the lamp 1 is closer as shown in a solid line 5b. However, such a phenomenon that the luminance is reduced again in positions set just above the lamp 1 (positions indicated as L1, L2 and L3 on an axis of abscissa in FIG. 6) is presented. Therefore, the technique of the present invention has an object to make the luminance uniform according to the shape of the reflecting plate 2 of a mirror surface.

As described above, if the reflecting plate 2 is flat, a luminance distribution shown in the solid line 5b is obtained. Consequently, it is necessary to collect the light reflected by the shape of the reflecting plate 2 into two places, that is, a portion provided just above the lamp 1 and a space between the two adjacent lamps 1. Therefore, the reflecting plate 2 has a convex structure between the two adjacent lamps 1. Furthermore, the sectional shape of the convex portion 6 is constituted by the sectional shape of a polyhedron obtained by a combination of a plurality of straight portions 7 as shown in FIG. 4. At least one of the straight portions 7 is set to have such an angle as to reflect the light of the lamp 1 onto a portion provided just above the lamp 1, and at least one of the other straight portions 7 is set to have such an angle as to collect the light between the two adjacent lamps 1. Moreover, angles $\theta_1$, $\theta_2$, $\theta_n$ formed by the respective straight portions 7 and a normal of the diffusing plate 3 have the following relationship, respectively:

$$\theta_1 < \theta_2 < \ldots < \theta_n \quad (1)$$

In other words, the convex portion 6 provided between the two adjacent lamps 1 forms a greater angle if a base bottom part is closer, which implies that the light is collected in a place closer to the lamp.

The convex portion 6 has the following shape. As shown in FIG. 4, the light transmitted from the lamp 1 is reflected onto a portion provided just above the lamp 1 and a portion between the two adjacent lamps 1 according to the shape of the convex portion 6 provided between the two adjacent lamps 1. The light is collected into the portion provided just above the lamp 1 through a base bottom part 8 of the convex portion 6 and the light is reflected onto the portion between the two adjacent lamps 1 by portions above the base bottom part 8. It is preferable that the sectional shape of the convex portion 6 is symmetrical with respect to a center line C of the two adjacent lamps 1 arranged in parallel as shown in FIG. 4. Moreover, it is desirable that the straight portion 7 forming the angle $\theta_n$ with the normal of the diffusing plate 3, that is, a top portion 9 is parallel with the diffusing plate 3 for easiness of working and stability of a dimension.

To the contrary, in the case in which the light is reflected onto the portion between the two adjacent lamps 1 through the base bottom part 8 of the convex portion 6 of the reflecting plate 2 and the light is reflected onto the portion provided just above the lamp 1 through an upper part, the height of the convex portion 6 is necessarily increased and the top portion 9 of the convex portion 6 has a sharp shape so that the following drawbacks are presented. First of all, the height of the convex portion 6 is increased. Therefore, the light of the lamps 1 arranged in parallel is mixed between the two adjacent lamps 1 with difficulty, and a variation in individual characteristics of the lamp 1 can be seen from a light emission surface with the ridge line of the convex portion 6 of the reflecting plate 2 being as a boundary. Thus, there is a higher possibility that the variation might be recognized as a luminance unevenness in a parallel direction with the lamp 1. Secondly, the top portion of the convex portion 6 of the reflecting plate 2 has a sharp shape. Therefore, it is hard to carry out the working. In particular, a reflecting surface is often subjected to a special working in order to increase the reflectance of light, so the working should not be carried out at an acute angle if possible. For the above-mentioned reasons, it is desirable that the convex portion 6 constituted by a plurality of straight lines satisfying the condition indicated in the formula (1) should be provided in a position corresponding to the portion between the two adjacent lamps 1 of the reflecting plate 2.

Moreover, the straight portion 7 constituting $\theta$ used in the formula (1) is intentionally fabricated in order to control and reflect the light, and such a shape as to form a bending portion (a rounded portion) or the like during the working is disregarded. More specifically, the formula (1) cannot be applied to a contact of the straight portions which is a corner.

Referring to $\theta_1$, moreover, $\theta_1 > \theta_2$ might be exceptionally set to easily carry out the working. In the present embodiment, furthermore, a metal plate having one of sides mirror finished is supposed for the reflecting plate and it is assumed that light is controlled through only the same working. However, it is sufficient that the reflecting surface should have the above-mentioned shape. After an ordinary metal plate is worked to have the above-mentioned shape, reflecting means, for example, a sheet-like reflecting member might be provided on the surface. Moreover, the metal plate does not need to be used for forming the above-mentioned shape, and the light reflecting means might be provided on a surface having a shape formed of a resin material. While the section has such a shape as to be constituted by the seven straight portions as an example of the shape of the convex portion 6 formed in the space between the two adjacent lamps in FIG. 4, at least three straight portions are required, and the shape of convex portion dose not need to be set as shown.

Figure 5:
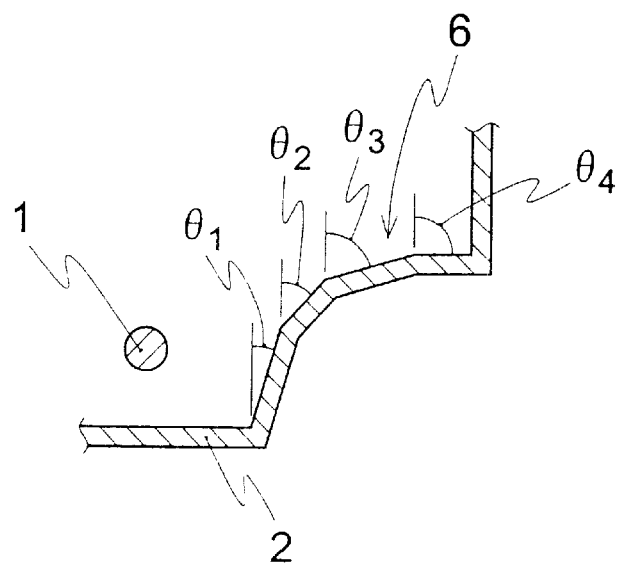
FIG. 5 is a sectional view showing an end of the reflecting plate of FIG. 2.

Next, the shapes of both ends of the reflecting plate 2 in the direction of the arrangement of the lamp 1 will be described in detail with reference to the drawings. FIG. 5 is an enlarged view showing the section of a corresponding portion. Since both ends are also fabricated by bending the reflecting plate 2, mirror reflection is carried out. If a convex portion is not provided between the two adjacent lamps 1, both end faces of the reflecting plate 2 are perpendicular to the diffusing plate 3 and the reflectance of the mirror surface of the reflecting plate 2 is sufficiently high, the light is reflected by the end faces and the lamps 1 virtually exist infinitely. In the present invention, however, the convex shape is formed between the two adjacent lamps 1. Therefore, the end faces should not be simple perpendicular walls. For example, both ends of the reflecting plate 2 should have such a shape that a half of the convex portion 6 sinks into a side surface. More specifically, as shown in FIG. 5, a shape having the same section as that of the convex portion between the two adjacent lamps 1 should be formed on both ends of the reflecting plate 2. Consequently, the light is returned toward the perpendicular reflecting plate 2 so that the lamp 1 and the convex portion 6 can be assumed infinitely. Therefore, it is possible to obtain uniform light emission up to the end of a screen.

Furthermore, a space for providing the wiring of the lamp 1 or the like is generated under the convex portion 6 of the reflecting plate 2 as an additional element. Thus, it is possible to manufacture a back light having an occupied space reduced still more.

Also in the whole sheet-like display device, similarly, a sheet-like display part such as a liquid crystal display panel and/or a member for an electric circuit for driving or turning on a light source such as a lamp are/is accommodated in a space provided under the convex portion 6. Consequently, it is possible to manufacture a sheet-like display device having an occupied space reduced.

Embodiment 2

Next, Embodiment 2 of the present invention will be described with reference to the drawings.

As described in Embodiment 1 of the present invention, a working and an assembly are to be carried out with high precision in order to enhance the uniformity of a luminance depending on the shape of the reflecting plate 2. For example, if the lamp 1 is warped and the amount of the warp is 1 mm, an angle of light incident on the reflecting plate 2 is greatly deviated so that a straight luminance unevenness is generated along the lamp 1. Even if the luminance unevenness is comparatively fine, it continuously appears in the axial direction of the lamp from end to end over the screen. Therefore, the luminance unevenness is easily recognized visually and readily makes troubles.

Figure 7A:
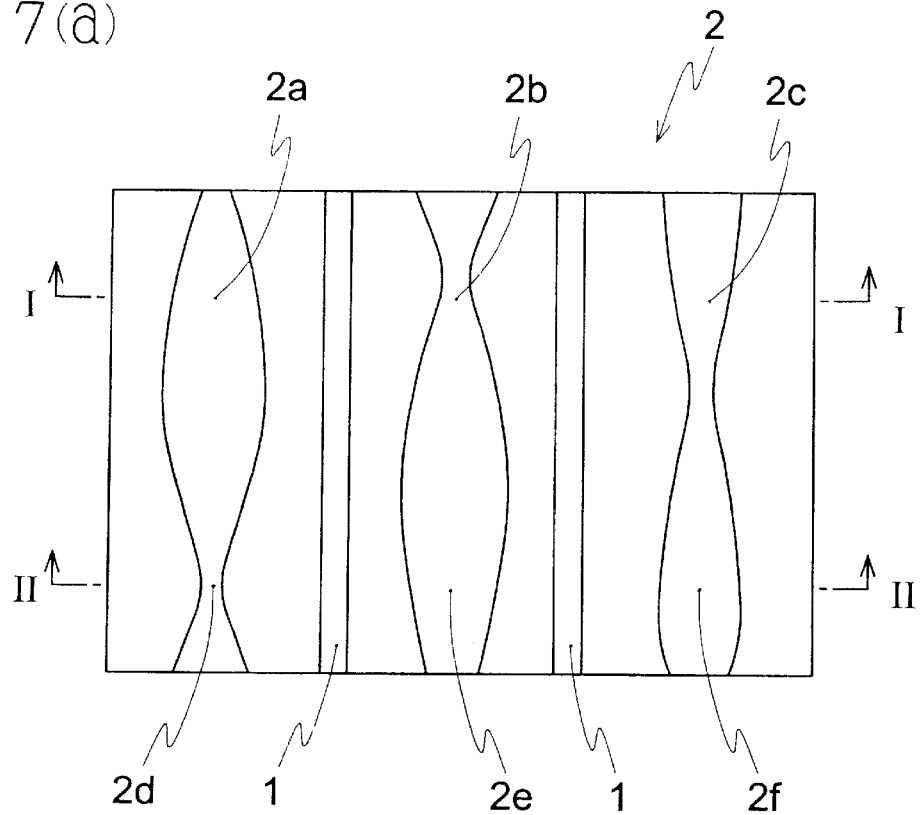
FIG. 7(a) is a plan view showing the shape of a convex portion according to a second embodiment of the sheet-like light source device of the present invention.
Figure 7B:
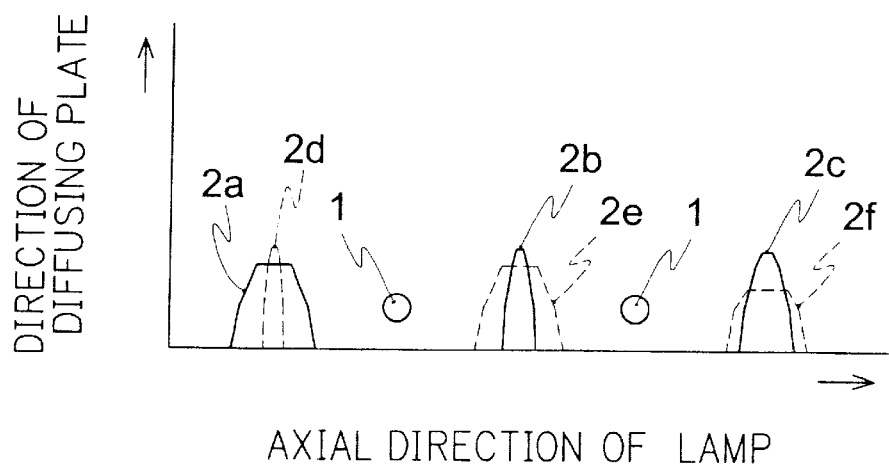
FIG. 7(b) shows parts 2a, 2b and 2c in solid lines in a sectional view taken along line I—I of FIG. 7(a) while parts 2d, 2e and 2f are shown in phantom lines in a sectional view taken along line II—II of FIG. 7(a)

The luminance unevenness is caused because the section of the sheet-like light source has the same shape in the axial direction of the lamp 1. A countermeasure can be taken by changing the sectional shape of the convex portion in the axial direction of the lamp 1. The shape is shown in FIGS. 7(*a*) and 7(*b*). In an optional section, it is desirable that the convex portion 6 of the reflecting plate 2 has such a shape that the luminance is made uniform. More specifically, shapes of the solidly lined section in FIG. 7(*b*) are taken along the line I—I in FIG. 7(*a*) and shapes of the phantom lined section in FIG. 7(*b*) are taken along the line II—II in FIG. 7(*a*). All shapes are optimized for the position of the lamp 1 having design values.

In parts 2*a* to 2*f* of the reflecting plate 2 in FIGS. 7(*a*) and 7(*b*), the shapes of the solidly lined section taken along the line I—I of FIG. 7(*a*) and the phantom lined section taken along the line II—II of FIG. 7(*a*) in the three convex portions are schematically shown in FIG. 7(*b*).

Figure 8:
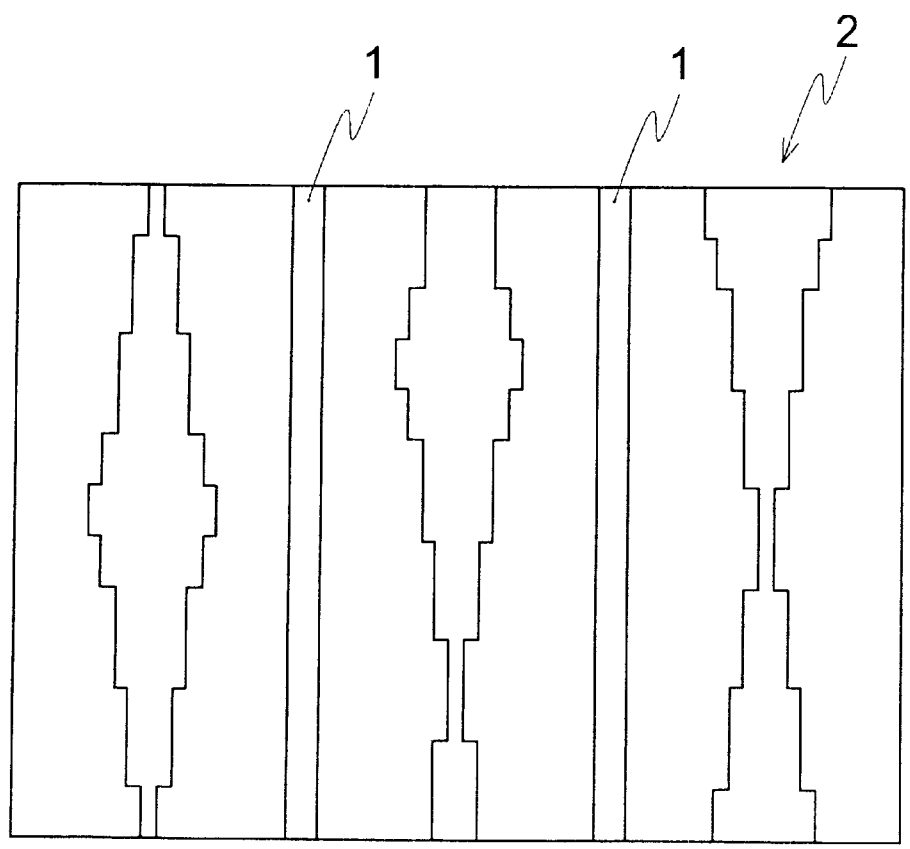
FIG. 8 is a view showing another example of the shape of the convex portion according to the second embodiment of the sheet-like light source device of the present invention.
Figure 9:
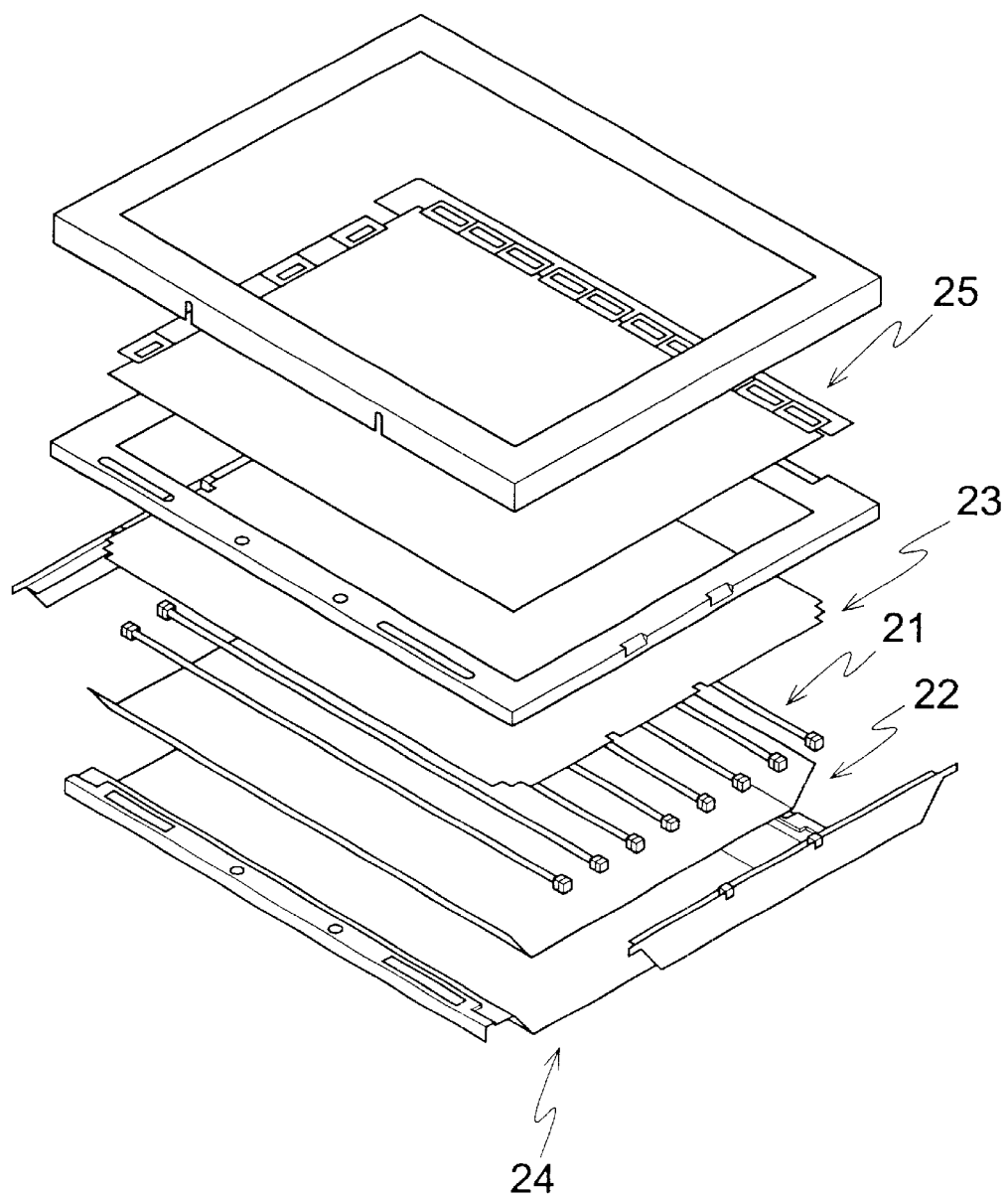
FIG. 9 is an exploded perspective view showing a conventional sheet-like display device.
Figure 10:
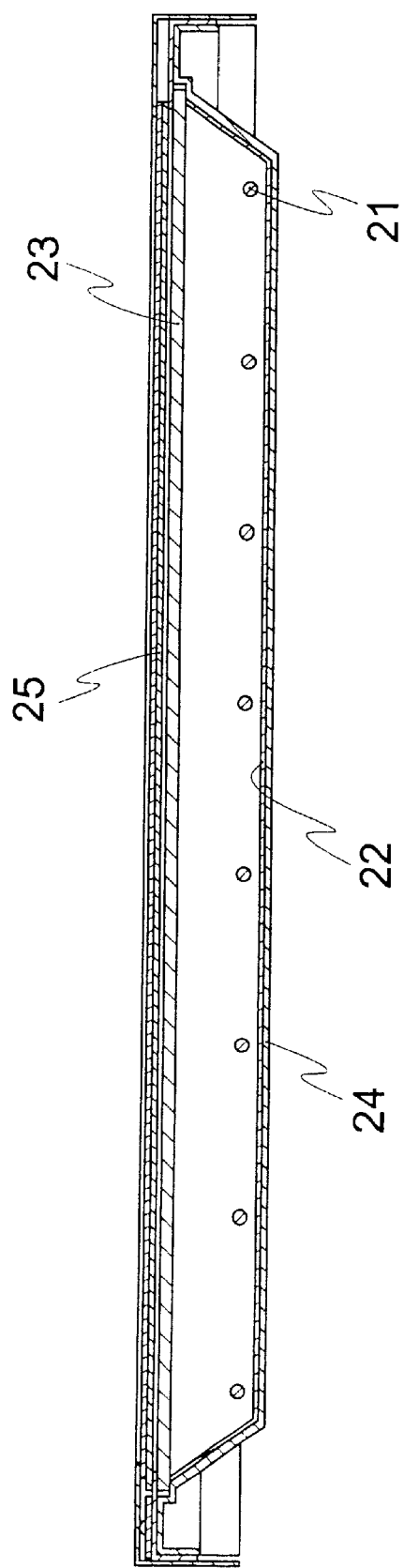
FIG. 10 is a sectional view showing the sheet-like display device of FIG. 9.

Consequently, the length in the axial direction of the luminance unevenness seen continuously in the axial direction of the lamp can be reduced and the luminance unevenness is hard to recognize visually. Moreover, while the shape of the convex portion 6 is continuously changed in FIG. 7, it might be changed intermittently as shown in FIG. 8.

Furthermore, it is desirable that the convex portion 6 takes such a sectional shape as to have a small height with a great width and to have a great height with a small width as shown in FIG. 7(*b*). Moreover, in the case in which a plurality of lamps 1 are provided, a plurality of convex portions 6 are fabricated between the lamps, respectively. If two adjacent convex portions 6 have the same shape, a luminance unevenness is generated in two places of the screen at the same time. Therefore, it is desirable that the two adjacent convex portions 6 have different sectional shapes.

While the straight cold cathode tube lamp has been taken as an example of the light source 1 in Embodiments 1 and 2, it is sufficient that linear light emission can be carried out and a hot cathode tube lamp, a U-shaped tube lamp or the like might also be used. While the reflecting plate 2 carries out mirror reflection in the present embodiments, a reflecting member having each performance of diffusion reflection and mirror reflection might be used. For example, it is also possible to use a reflecting member having a mirror reflectance of 80% and a diffusion reflectance of 15%. Also in that case, it is sufficient that the convex portion 6 has the sectional shape described in Embodiments 1 and 2. While each convex portion 6 is formed between the two adjacent lamps 1 in the present embodiments, it is sufficient that the light transmitted from the lamp 1 can be reflected to be irradiated uniformly on the diffusing plate 3. A plurality of convex portions 6 might be formed between the two adjacent lamps 1. Also in this case, however, it is sufficient that the convex portion 6 has the sectional shape described in Embodiments 1 and 2.

According to the present invention, in the sheet-like light source device having a plurality of bar-shaped light sources, a reflecting plate and a diffusing plate, it is possible to obtain uniform light emission by forming a convex portion having a sectional shape constituted by a plurality of straight portions between two adjacent light sources in the reflecting plate. Therefore, it is possible to decrease or remove shield printing which has conventionally been carried out over the diffusing plate. Thus, it is possible to manufacture a back light having a high efficiency. Moreover, it is possible to easily manufacture a convex portion taking such a sectional shape that an angle formed by a straight portion and a normal of the diffusing plate is increased from the base bottom part of the convex portion toward a top portion thereof.

The convex portion having the same shape as that provided between the light sources is formed on both ends of the reflecting plate, and the reflecting plate is bent perpendicularly to the diffusing plate from an apex thereof. Consequently, it is possible to obtain uniform light emission from end to end over the screen.

Furthermore, the shape of the convex portion is changed in the axial direction of the lamp. Consequently, it is hard to visually recognize a luminance unevenness generated through a relative shift of the light source from the reflecting plate which is caused during the fabrication and assembly of the reflecting plate.

What is claimed is:

1. A sheet-like light source device comprising a plurality of bar-shaped light sources, a diffusing plate for diffusing light emitted from the light sources, and a reflecting plate capable of mirror reflecting the light emitted from the light sources to the diffusing plate side, the reflecting plate being provided in a position opposite to the diffusing plate with respect to the light sources, wherein the reflecting plate has at least one convex portion formed in parallel with the light sources in a space between the two adjacent light sources.

2. The sheet-like light source device of claim 1, wherein the convex portion takes a sectional shape having three or more straight portions.

3. The sheet-like light source device of any one of claim 1 and 2, wherein a straight portion forming at least a base bottom part of the convex portion is set to have such an angle as to reflect the light emitted from the light source onto a part almost just above the light source, and a straight portion provided on the base bottom part of the convex portion is set to have such an angle as to reflect the light emitted from the light source onto a portion between the two adjacent light sources.

4. The sheet-like light source device of claim 3, wherein an inclination of each straight portion constituting the sectional shape of the convex portion has a relationship of:

$$\theta_1 < \theta_2 < \ldots < \theta_n$$

(wherein $\theta_n$ represents an angle formed by the straight portion and a normal of the diffusing plate and n=1 represents a straight portion forming the base bottom part of the convex portion of the reflecting plate).

5. The sheet-like light source device of claim 4, wherein the sectional shape of the convex portion is symmetrical with respect to a center line of the two adjacent light sources arranged in parallel.

6. The sheet-like light source device of claim 3, wherein a straight portion constituting the section of the convex portion which is the closest to the diffusing plate is parallel with the diffusing plate.

7. The sheet-like light source device of claim 1, wherein both ends of the reflecting plate in a direction of the arrangement of the light sources is constituted by a portion perpendicular to the diffusing plate and a half on one of sides of the convex portion.

8. The sheet-like light source device of claim 1, wherein the convex portion has a plurality of sectional shapes in an axial direction of the light source.

9. The sheet-like light source device of claim 8, wherein the sectional shapes of the convex portion is continuously changed in the axial direction of the light source.

10. The sheet-like light source device of any one of claims 8 and 9, wherein a plurality of convex portions are provided and two adjacent convex portions have different sectional shapes.

11. The sheet-like light source device of any one of claims 1 and 2, wherein a wiring of the light source is accommodated on an internal face side of the convex portion.

12. A sheet-like display device comprising a sheet-like source device and at least a plane type display part, wherein the sheet-like source device comprises a plurality of bar-shaped light sources, a diffusing plate for diffusing light emitted from the light sources, and a reflecting plate capable of mirror reflecting the light emitted from the light sources to the diffusing plate side, the reflecting plate being provided in a position opposite to the diffusing plate with respect to the light sources, and wherein the reflecting plate has at least one convex portion formed in parallel with the light sources in a space between the two adjacent light sources.

13. The sheet-like display device of claim 12, wherein the plane type display part displays an image by utilizing a birefringence of a liquid crystal.

14. The sheet-like light source device of any one of claims 1 and 2, wherein a member for an electric circuit is accommodated on an internal face side of the convex portion.

* * * * *